US008048181B2

(12) United States Patent
Schneider et al.

(10) Patent No.: US 8,048,181 B2
(45) Date of Patent: Nov. 1, 2011

(54) FILTER APPARATUS

(75) Inventors: Thomas Schneider, Friedrichsthal (DE); Ralf Wnuk, Bexbach/Kleinottweiler (DE)

(73) Assignee: Hydac Process Technology GmbH, Neunkirchen (DE)

( * ) Notice: Subject to any disclaimer, the term of this patent is extended or adjusted under 35 U.S.C. 154(b) by 42 days.

(21) Appl. No.: 12/226,320

(22) PCT Filed: Jul. 19, 2007

(86) PCT No.: PCT/EP2007/006410
§ 371 (c)(1),
(2), (4) Date: Oct. 15, 2008

(87) PCT Pub. No.: WO2008/017370
PCT Pub. Date: Feb. 14, 2008

(65) Prior Publication Data
US 2010/0146916 A1  Jun. 17, 2010

(30) Foreign Application Priority Data
Aug. 8, 2006 (DE) .................... 10 2006 036 943

(51) Int. Cl.
*B01D 50/00* (2006.01)

(52) U.S. Cl. ............... 55/337; 55/428; 55/432; 55/447; 55/459.1

(58) Field of Classification Search .............. 55/337, 55/428, 432, 447, 459.1, 462–464
See application file for complete search history.

(56) References Cited

U.S. PATENT DOCUMENTS

| RE28,396 | E | * | 4/1975 | Berz et al. ............. | 55/294 |
|---|---|---|---|---|---|
| 4,336,040 | A | * | 6/1982 | Haberl ............. | 55/304 |
| 6,129,775 | A | | 10/2000 | Conrad et al. | |
| 6,176,904 | B1 | | 1/2001 | Gupta | |
| 6,214,071 | B1 | * | 4/2001 | Wang ............. | 55/337 |
| 7,422,614 | B2 | * | 9/2008 | Sepke et al. ............. | 55/337 |
| 7,540,894 | B2 | | 6/2009 | Ni ............. | 55/345 |
| 7,594,941 | B2 | * | 9/2009 | Zheng et al. ............. | 55/299 |
| 2004/0055470 | A1 | * | 3/2004 | Strauser et al. ............. | 96/417 |
| 2005/0050863 | A1 | * | 3/2005 | Oh ............. | 55/345 |
| 2006/0037291 | A1 | * | 2/2006 | Oh et al. ............. | 55/337 |

(Continued)

FOREIGN PATENT DOCUMENTS
DE  37 35 106 A1  4/1989
(Continued)

OTHER PUBLICATIONS
Unexamined Utility Model Publication (kokai); Publication No. 57-82957; May 22, 1982; 15 pages.
(Continued)

*Primary Examiner* — Jason M Greene
*Assistant Examiner* — Dung H Bui
(74) *Attorney, Agent, or Firm* — Roylance, Abrams, Berdo & Goodman, L.L.P.

(57) ABSTRACT

A filter apparatus deposits impurities from a fluid stream by use of a filter element (10) accommodated in a filter casing (12). The filter casing (12) has a swirl space (14) such that the fluid stream to be filtered is conducted at least partly in a swirling flow around the filter element (10). The properties of a cyclone are utilized for the actual filtration operation to the extent that the swirl space of the filter casing brings about multiple deflection of the direction of motion of the fluid to be filtered.

10 Claims, 2 Drawing Sheets

U.S. PATENT DOCUMENTS

| | | | |
|---|---|---|---|
| 2006/0236663 A1* | 10/2006 | Oh | 55/337 |
| 2006/0277712 A1* | 12/2006 | Kim et al. | 15/353 |
| 2007/0039292 A1* | 2/2007 | Oh et al. | 55/337 |
| 2007/0151071 A1* | 7/2007 | Son et al. | 15/347 |
| 2008/0264009 A1* | 10/2008 | Lee et al. | 55/345 |
| 2009/0205298 A1* | 8/2009 | Hyun et al. | 55/343 |
| 2009/0320421 A1* | 12/2009 | Qian | 55/441 |
| 2010/0043170 A1* | 2/2010 | Ni | 15/352 |

FOREIGN PATENT DOCUMENTS

| | | |
|---|---|---|
| DE | 38 28 417 A1 | 2/1990 |
| DE | 42 14 324 A1 | 11/1993 |
| DE | 197 11 589 A1 | 9/1998 |
| EP | 0 659 462 A1 | 6/1995 |
| JP | 2003-311186 | 11/2003 |
| WO | WO 03/059821 A1 | 7/2003 |

OTHER PUBLICATIONS

Examined Patent Publication (kokoku); Publication No. 38-11243; Jul. 4, 1963; 6 pages.

Unexamined Utility Model Publication (kokai); Publication No. 59-127756; Aug. 28, 1984; 9 pages.

* cited by examiner

FILTER APPARATUS

FIELD OF THE INVENTION

The invention relates to a filter apparatus for separating impurities from a fluid stream by using a filter element accommodated in a filter housing.

BACKGROUND OF THE INVENTION

Similar hydraulic filters and filter apparatus are readily available on the market in a plurality of embodiments (e.g., DE 197 11 589 A1). In addition to suction filter apparatus, filter apparatus as return line filters, in-line filters, or ventilation filters are known. In generic terms they are often referred to as hydraulic filters. Generally, these hydraulic filters are devices for separation of solids, with fibrous, grainy, or lattice-shaped filter media being used to separate solids from liquids or for separating dusts from gases.

Furthermore, other separation devices in the prior art (e.g., DE 42 14 324 A1) are cyclones which are devices with which the action of a centrifugal force separates particles of solids from gases or liquids which are subsumed in the jargon under the generic term fluid. In the aforementioned solution, the cyclone is located in a ventilation path leading from a driving mechanism space (crank space) to the intake line of an internal combustion engine so that aerosols entrained by the air are separated in the cyclone and can be delivered by an outlet to an oil sump of the internal combustion engine. To be able to prevent unwanted feed of oil from the oil sump into the cyclone even under extreme operating conditions, a stop safeguard in the form of a float valve is on the outlet side.

This cyclone separation technology has also already been used in combination with filter devices. Thus, DE-OS 37 35 106 discloses a process for separating liquid particles from gases, in particular in the form of aerosols from exhaust gases, in which the gases are centrifuged first and then filtered. Some of the filtrate gases are then relayed to a cyclone. The liquid particles entrained in the gas flow are combined into droplets by frequent deflection of the direction of their motion (swirling flow). The droplets emerge by their own weight from of the separation device.

Furthermore, U.S. Pat. No. 6,129,775 A discloses a cyclone separator with a predominantly conically running separation housing in which, following the wall of the separation housing and with the formation of a swirl space spaced analogously, a usually self-contained guide body enables improved swirl guidance for separating the particles in the swirl space for a tangentially supplied fluid flow with particle fouling. Filtration by a filter element is not possible with the known solution.

The prior art (e.g., EP 06 59 462 A1) also discloses solutions in which, for further particle separation, in the bypass flow of a cyclone separator a filter element is held in a separate filter housing following in the direction of the fluid stream. The filtration line of these known solutions still leaves much to be desired.

SUMMARY OF THE INVENTION

An object of the invention is to provide a filter apparatus with improved filtration properties.

This object is basically achieved by a filter apparatus where the filter housing has a swirl space such that the fluid stream to be filtered is routed at least partially around the filter element in a swirling flow. For actual filtration operation, the properties of the cyclone are used in so far as the swirl space of the filter housing causes repeated deflection of the direction of motion of the fluid to be filtered. The associated swirling flow is able to be established along the entire filter surface of the filter element, with the result that the fluid stream to be filtered passes through the filter element to an increased degree and with high energy input, with simultaneous retention or separation of impurities. The swirling flow achieved in the filter housing caused by the action of the swirl space yields a laminar, helix-like fluid flow. In contrast to the otherwise conventional radial throughflow of a filter element transversely to its longitudinal axis, the filter apparatus of the invention leads to improved filtration performance and results. In this way, an increased throughput rate of the fluid to be filtered through the filter element can be achieved.

In one preferred embodiment of the filter apparatus according to the invention, the swirl space is formed by a conical widening of the filter housing in the direction of its one housing end. The feed inlet for the unfiltered medium extends through the filter housing off-center to the longitudinal axis of the filter element. This off-center feed causes improved generation of a cyclone-like flow under the action of the swirl space in the filter housing.

The conical widening of the filter housing in the region of the swirl space preferably undergoes transition into a cylindrical housing part or into one with a small conical tilt, with the result that partial damping of the swirl-like fluid flow occurs with reduced wall distances between the outside of the filter element and the inside of the filter housing. A kind of forced guidance for the purpose of a compressed fluid flow then results to increase the feed amount of fouled fluid for the filter element in this way.

In another preferred embodiment of the filter apparatus according to the invention, with a definable axial distance above on the free end of the filter element, a collecting space adjoins likewise contributing to making the fluid flow uniform in the upper region, and helping prevent supercritical turbulences within the fluid flow. This supercritical turbulence otherwise could adversely affect the filtration performance of the filter apparatus.

Other objects, advantages and salient features of the present invention will become apparent from the following detailed description, which, taken in conjunction with the annexed drawings, discloses a preferred embodiment of the present invention.

It has proven especially advantageous with respect to the described structure of the filter housing to use as filter elements those whose filter element extends conically. It has also proven especially advantageous to use slit screen tube filter elements as filter elements.

BRIEF DESCRIPTION OF THE DRAWINGS

Referring to the drawings which form a part of this disclosure and which are schematic and not to scale.

DETAILED DESCRIPTION OF THE INVENTION

Figure 1:
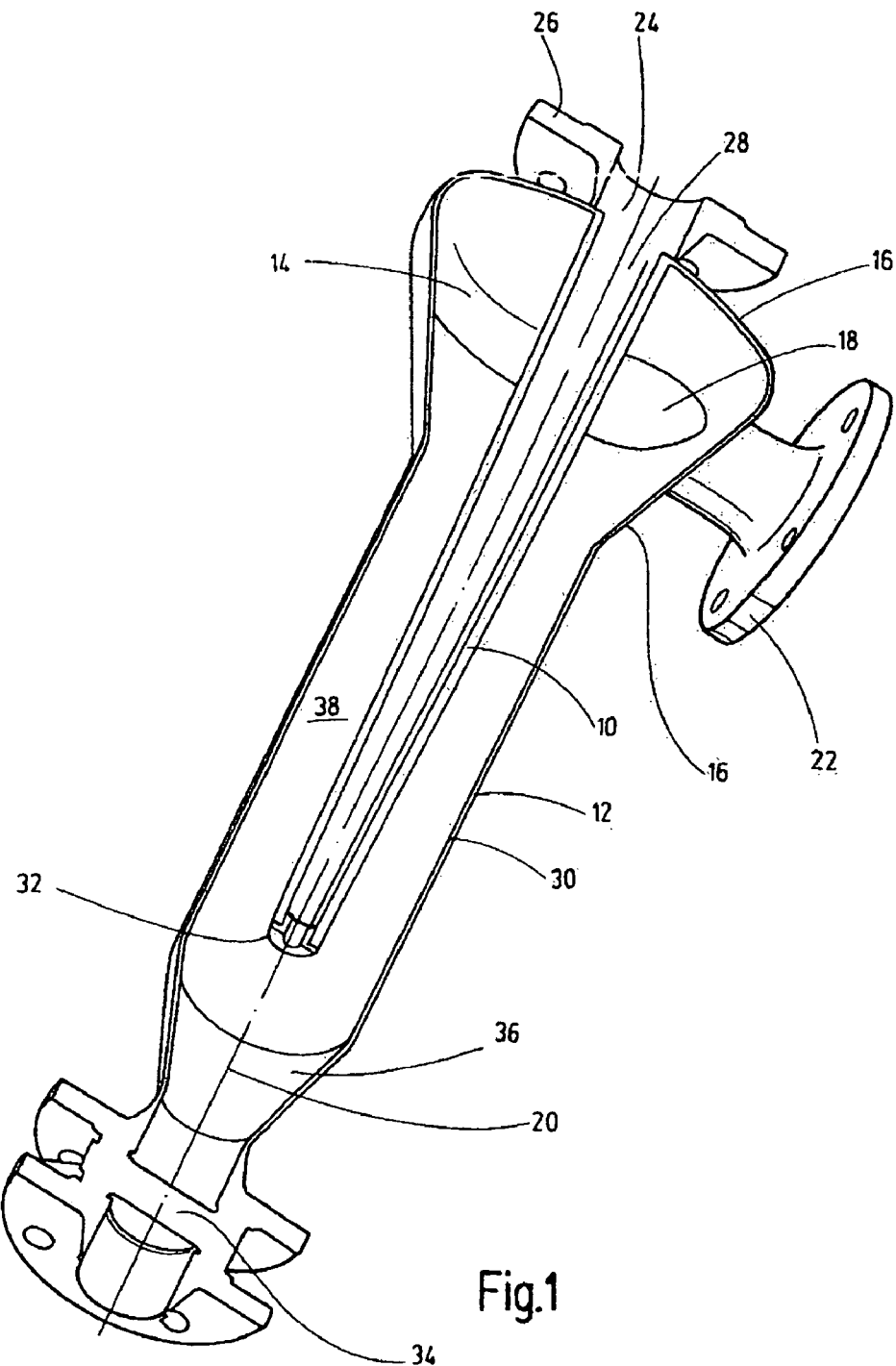
FIG. 1 is a perspective view in section of a filter apparatus according to an exemplary embodiment of the invention.
Figure 2:
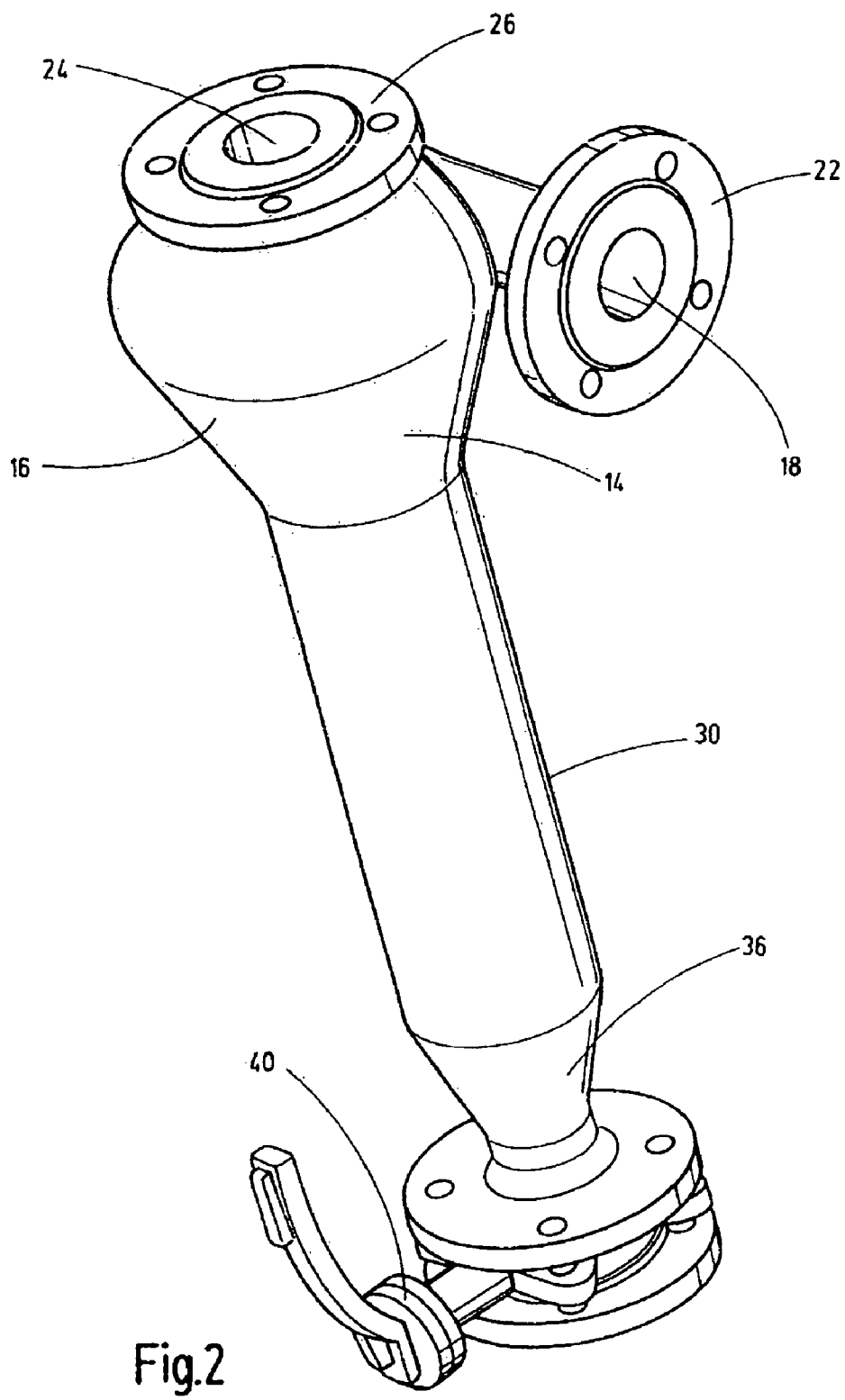
FIG. 2 is a perspective view of the filter apparatus of in FIG. 1 in the state closed on the housing side and in another viewing direction.

The filter apparatus according to the invention is used to separate impurities from a fluid stream, for example formed by a hydraulic medium. Fundamentally, the filter apparatus can also be used for gaseous media, aerosols, etc., which likewise form fluids. FIGS. 1 and 2 correspond to the conventional installation direction. To the extent the terms "top" and "bottom" are used below in this respect, they relate to the representations of the operating situation of the filter apparatus as shown in FIGS. 1 and 2.

The filter element 10 shown in FIG. 1 is accommodated by a filter housing 12 of the filter apparatus. The filter housing 12 on its top end has a swirl space 14 used to route the fluid to be filtered at least partially in a swirling flow or cyclone flow around the filter element 10. In the illustrated solution, the swirl space 14 is formed by a conical widening of the filter housing 12 in the direction of its top end 16. Instead of this conical widening produced by the housing wall, in addition or as an alternative, on the inside of the filter housing 12 flow baffles—also in the manner of turbulators—(not shown) could be used. To produce the swirling flow, the feed inlet 18 for the unfiltered media is located off-center to the longitudinal axis 20 of the filter element 10 and in this respect extends through the housing wall on the top end of the swirl space 14. To the outside the feed inlet 18 is provided with a flange-like widening 22 for connecting other fluid-carrying pipe elements or other line elements (not shown).

After the fluid to be filtered flows from the outside to the inside through the filter element 10, the filtrate stream, that is, the filtered fluid, is withdrawn from the filter housing 12 via the drain 24 in the housing top. The free end of the drain 24 is in turn provided with a flange 26 used like the flange 22 to connect fluid-carrying lines to the filter apparatus. The drain 24 is placed on the top end of the filter housing 12 and, viewed in cross section, has a slightly larger cross section at the top fluid exit site 28 out of the filter housing 12. The feed inlet 18 and drain 24 can optionally be produced in one piece together with the filter housing 12. The corresponding connection to the remaining filter housing 12 is possible by weld connections.

As furthermore follows especially from FIG. 1, the conical widening forming the swirl space 14 undergoes transition in the direction of the bottom of the filter apparatus into a cylindrical housing part 30 also having a smaller conical tilt (not shown) opposite the swirl space 14. The swirling flow produced in the swirl space 14 is made uniform over the further housing part 30 in terms of the progression of the cyclone. This uniformly promotes fluid passage through the filter element 10. The cross sectional reduction from the swirl space 14 to the housing part 30 also contributes to this fluid passage. The free end 32 of the filter element 10 is oriented in the direction of the closed end 34 of the filter housing 12. At a definable axial distance to the filter element 10 the closed end forms a collecting space 36 which, in spite of the partially turbulent flow dictated by the swirl space 14, leads to more uniformity of the fluid stream penetrating the filter element 10 and otherwise produces good filling in the interior 38 of the filter housing 12. This arrangement promotes energy-efficient operation of the filter apparatus.

In particular, in this way fluid-free cavities do not form within the filter apparatus. This forming otherwise could lead to damaging cavities for the hydraulic circuit connected to the filter apparatus in operation. The closed end 34 can also be produced by a switch fitting 40 (cf. FIG. 2) which, for example, made as a ball valve enables opening of the bottom end of the filter housing 12. In this way, for example, it would be possible, with the switch fitting 40 closed, to carry out the already described filtration operation, and when the bottom end of the filter housing 12 is opened, for example, the impurities arising in a backflushing process to be carried out and discharged from the filter apparatus. In the pertinent backflushing operation, cleaned fluid is routed from the inside to the outside through the filter element, preferably from the clean side of the filter apparatus, that is, coming from the drain 24. This operation leads to cleaning of the passages in the filter element 10. The dirt backflushed in this way could then be discharged from the filter apparatus by way of the interior 38 of the filter housing 12 and by way of the lower bottom opening of the filter housing 12.

Fundamentally, for backflushing a housing situation as shown in FIG. 1, the cleaned fluid is backflushed from the clean side (drain 24) in the direction of the unfiltered material side (feed inlet 18). The delivery of unfiltered material would have to be stopped. With a somewhat smaller tilt than applies to the housing wall of the swirl space 14, the collecting space 36 tapers likewise conically in the direction of the free or closed end 34 of the filter housing 12. This conical tapering allows a partial pressure rise in the collecting space 36 for operation of the apparatus, promoting complete filling for the filter apparatus.

The filter element 10, as already addressed, is made as a slit screen tube filter element. DE 197 11 589 shows the more detailed structure of such a slit screen tube filter element. This element 10 includes individual supports bars around which a wire profile is wound in individual turns, leaving exposed gaps through which fluid can pass. A weld is in the region of each contact site of the wire profile with the assignable support bar. For improved filtration operation, the filter element 10 is made conical. The turns of the wire profile decrease in diameter in the direction of the tilted ends of the support bars. The length of the slit screen tube filter element measured in the direction of the longitudinal axis 20 is roughly 11 times greater than the largest exit cross section in the region of the outlet or drain 24. Since slit screen tube filter elements are fundamentally prior art, the pertinent element 10 in FIG. 1 is shown only in terms of its conical structure.

The conical structure of the slit screen tube filter element 10 results in less resistance being offered to the fluid stream entering the housing 30 from the swirl space 14, relative to a solution with an exclusively cylindrically made element, with the result that the pressure difference for the entire filter apparatus is reduced in an energy-efficient manner. A constant liquid stream is also achieved by the conical structure when the element 10 is backflushed. Conversely for a cylindrical element (not shown) which could likewise be used in this embodiment, the speed in its longitudinal direction continuously increases. This increasing speed opposes uniform entry into the interior of the filter element.

The installation conditions are implemented such that viewed in the longitudinal direction (longitudinal axis 20) of the filter element 10, the overall length of the swirl space 14 with its conical housing wall 16 and of the collecting space 36 corresponds to a least one third, but less than half, of the installation length of the filter element 10. The overall length of the swirl space 14 corresponds essentially to the overall length of the collecting space 36 extending from the end 32 of the filter element 10 to the end 34 of the filter housing 12.

The filter apparatus according to the invention, in particular when it is built essentially in one piece except for the filter element 10, can be extremely economically produced and therefore operated as a disposable article. Depending on the pressures which arise, the filter apparatus can also be made as a plastic injection molding or can be made of metallic materials including sheet metal and casting materials. The housing wall 16 of the swirl space 14 can be made as a dished bottom.

In a further configuration of the filter apparatus according to the invention which is not shown, it can be additionally provided that potential light floating materials may be removed from the filter housing via another outlet site in the region of the top housing end 16 of the filter housing 12 with formation of a kind of overflow line. Preferably the respective sealing opening relative to the longitudinal axis 20 is diametrically opposite the feed inlet 18. The overflow line, comparably to the other connection sites, can have a corresponding flange body, as shown.

While one embodiment has been chosen to illustrate the invention, it will be understood by those skilled in the art that various changes and modifications can be made therein without departing from the scope of the invention as defined in the appended claims.

What is claimed is:

1. A filter apparatus for separating impurities from a fluid stream, comprising:
    a filter housing having opposite first and second ends and having a conical widening tapering from said first end toward said second end and forming a swirl space in said first end of said filter housing conveying the fluid stream to be filtered at least partially in a swirling flow; and
    a filter element accommodated in said filter housing and tapering conically from said swirl space toward said second end of said housing, the fluid stream to be filtered being conveyed in the swirling flow about said filter element.

2. A filter apparatus according to claim 1 wherein
    a feed inlet for unfiltered medium extends through said filter housing off-center relative to a longitudinal axis of said filter element.

3. A filter apparatus according to claim 1 wherein
    said filter element is formed as a split screen tube filter element.

4. A filter apparatus according to claim 1 wherein
    a drain for filtered fluid extends through one of said ends of said filter housing and establishes a fluid connection to an interior of said filter element.

5. A filter apparatus according to claim 4 wherein
    said conical widening transitions into a housing part being one of cylindrical and with a small conical taper.

6. A filter apparatus according to claim 1 wherein
    said filter element comprises a free end oriented in a direction toward and spaced from said second end of said filter housing to form a collecting space at a definable axial distance to said filter element.

7. A filter apparatus according to claim 6 wherein
    an overall length of said swirl space and said collecting space along a longitudinal axis of said filter element corresponds to at least one-third but less than one-half of an installation length of said filter element.

8. A filter apparatus according to claim 6 wherein
    said collecting space tapers conically at least partially in the direction toward said second end of said filter housing.

9. A filter apparatus according to claim 8 wherein
    an overall length of said swirl space and said collecting space along a longitudinal axis of said filter element corresponds to at least one-third but less than one-half of an installation length of said filter element.

10. A filter apparatus according to claim 8 wherein
    said collecting space tapers with a smaller tilt than said conical widening.

* * * * *